May 23, 1933.  A. M. TROGNER  1,911,169
AIR NAVIGATION APPARATUS
Filed Feb. 21, 1929
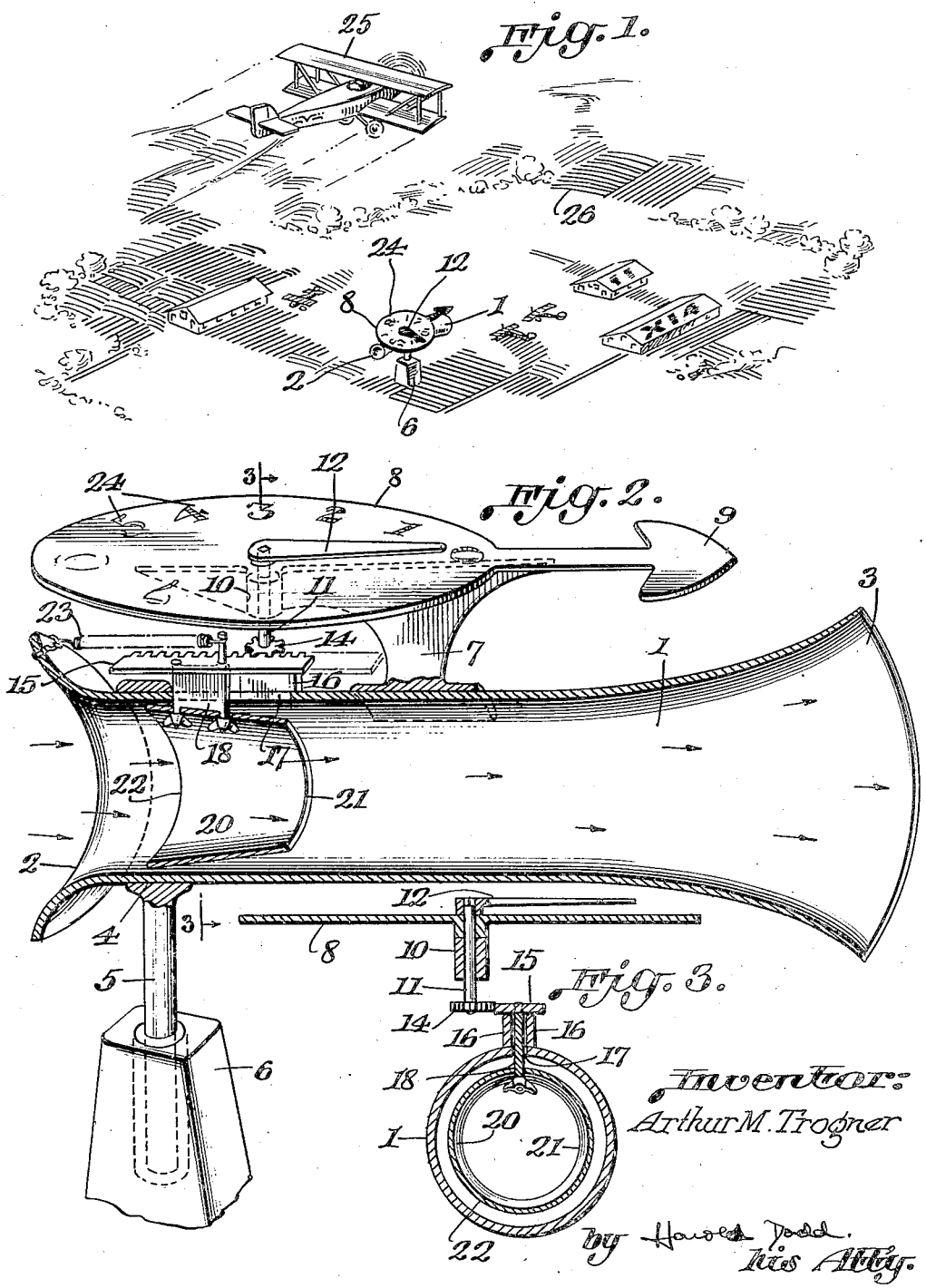

Patented May 23, 1933

1,911,169

UNITED STATES PATENT OFFICE

ARTHUR M. TROGNER, OF EAST ORANGE, NEW JERSEY, ASSIGNOR TO WIRED RADIO, INC., OF NEW YORK, N. Y., A CORPORATION OF DELAWARE

AIR NAVIGATION APPARATUS

Application filed February 21, 1929. Serial No. 341,813.

My invention relates broadly to air navigation and more particularly to an apparatus for indicating to aviators the velocity and direction of the wind.

One of the objects of my invention is to provide an apparatus for installation on an aircraft landing field or along the course of travel of aircraft which may be observed by pilots of aircraft from relatively high altitudes for informing the pilot as to the velocity and direction of the wind at the ground level for facilitating air navigation.

Another object of my invention is to provide a structure which may be pivotally mounted in a position on the ground visible to aircraft overhead for indicating to pilots the direction and velocity of the wind at the ground level to thereby convey such information to the pilot as will permit safe landing or flight.

Still another object of my invention is to provide a construction embodying an air passage and resistive orifice therein whereby both the direction and the velocity of the wind may be indicated upon a dial visible to the pilots of aircraft.

My invention will be more clearly understood from the specification hereinafter following by reference to the accompanying drawing, wherein:

Figure 1 schematically shows the method of mounting the wind direction and velocity meter of my invention on an aircraft landing field visible to a pilot from an overhead position; Fig. 2 is a longitudinal cross-sectional view taken through the air passage of the apparatus of my invention with parts of the apparatus shown in perspective view; and Fig. 3 is a cross-sectional view taken on line 3—3 of Fig. 2.

With the increase in importance of air navigation weather conditions are communicated to airports for information of pilots and flyers. Weather reports are communicated to aircraft by radio to keep pilots fully informed as to weather conditions. There are often instances, however, where communication is interfered with or reception impaired, leaving the pilot to his own resources with respect to navigation under variable conditions of velocity and direction of wind particularly upon arriving at an air port.

My invention is directed to an apparatus which may be mounted upon a landing field or along the course of travel by aircraft in a position visible to pilots overhead for positively indicating the direction of the wind and the velocity of the wind. The apparatus of my invention includes a tubular member 1 forming an air passage having an inlet 2 and an outlet 3. The tube 1 is balanced and supported as represented at 4 on a rotatable spindle 5 which is suitably mounted in a foundation 6 in such manner that the entire tube is free to revolve and will normally occupy that position in which the central axis of the tube coincides with the direction of the wind. I provide a supporting member 7 mounted upon the tube 1 which carries a dial 8 terminating in an arrow 9 of such size as is clearly visible from a relatively high altitude. The arrow 9 extends in a direction coinciding with the longitudinal axis of the tube 1. The member 7 carries a supporting journal 10 in which there is mounted a spindle 11 carrying a pointer 12 on one end and having a gear or pinion 14 on the opposite end. The gear 14 meshes with a slidable rack 15 movable along the guides 16 which are supported on the tube 1. The guides 16 extend on opposite sides of a slot 17 formed in tube 1 and permit the passage therethrough of a plate member 18 which is secured to the rack 15 at one end and to an orifice or truncated conical member 20 at the other end. The member 20 has an inner end 21 of small diameter and an outer end 22 of large diameter centered within the tube 1 in a position whereby wind in passing through tube 1 may be restricted in its flow to such an extent that the member 20 is carried forward by the wind pressure against the action of spring 23 shifting the rack 15 and turning spindle 11 by revolving gear 14. The pressure of the wind will in general increase as the square of the velocity, and the scale reading of the indicator progressively increases when the velocity of the wind increases. Indicator 12 is thus revolved over a suitable scale calibrated as represented at 24. The calibrations 24 are sufficiently large as to be read from a high elevation and the pilot is thus informed of the direction of the wind by noting the direction of arrow 9 and the speed of the wind by noting the position of indicator 12.

In Figure 1, I have shown an aircraft at 25 preparing to land upon landing field 26 where the pilot is observing the direction of the wind and the speed of the wind by use of the apparatus of my invention and may thus effect a safe landing.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. An apparatus for indicating the direction and speed of the wind comprising, a tubular member pivotally mounted for rotation by the wind in a substantially horizontal plane to a longitudinal position coincident with the direction of the wind, a horizontal dial means supported by said tubular member and provided with a pointer extending in the direction corresponding to the longitudinal axis of said tubular member, an indicating pointer associated with said dial means and rotatable in a substantially horizontal plane, wind responsive means movably mounted interiorly of said tubular member, means gearing said movably mounted means to said indicating pointer whereby the position of said indicating pointer in relation to said dial progressively advances when the velocity of the wind increases through said tubular member.

2. In an apparatus for indicating the direction and velocity of the wind, a tubular member pivotally mounted for rotation by the wind in a substantially horizontal plane to a longitudinal position coincident with the direction of the wind, a horizontal dial means carried by said tubular member, an indicating pointer associated with said dial means and rotatable in a substantially horizontal plane, movable wind responsive means mounted interiorly of said tube and means gearing said movably mounted means to said indicating pointer whereby the position of said indicating pointer with respect to said dial indicates the velocity of the wind.

3. In an apparatus for indicating the direction and velocity of the wind, a tubular member pivotally mounted adjacent one end for rotation by the wind in a substantially horizontal plane, a horizontal dial means supported by said tubular member, a journal carried by said means, an indicator member rotatable in said journal in a substantially horizontal plane over said dial means, an orifice member, and means mounting said orifice member to slide within said tubular member when the velocity of the wind varies, and geared connections between said orifice member and said indicator member for imparting movement to said indicator member when the velocity of the wind varies.

4. An apparatus for indicating the direction and velocity of the wind comprising, a tubular member pivotally mounted at one end and capable of movement in a horizontal plane to a longitudinal position coincident with the direction of the wind, a horizontal dial means supported by said tubular member, a journal carried by said means, an indicator member rotatable in said journal in a substantially horizontal plane over said dial means, an orifice member having the form of a frusto-conical central member and means mounting said orifice member for slidable movement concentrically within said tubular member, and geared connections extending between said orifice member and said indicator member for imparting movement to said indicator member when the velocity of the wind changes.

5. An apparatus for indicating the direction and velocity of the wind comprising, a tubular member pivotally mounted at one end and capable of movement by the wind in a horizontal plane for assuming longitudinal positions coincident with the direction of the wind, a horizontal dial means supported by said tubular member, a rotary indicator member, an orifice member having the form of a frusto-conical central member shiftable through said tubular member, a rack connected with said orifice member and arranged to move simultaneously therewith, a spindle connected to said rotary indicator member and carrying a pinion, said rack meshing with said pinion for imparting movement to said spindle when the velocity of the wind varies, said spindle projecting through said dial means and carrying said indicator member which is adapted to rotate around the face of said dial means for observation from an airplane thereabove, and means for normally urging said orifice member in a direction opposite to the direction of the wind.

ARTHUR M. TROGNER.